Aug. 9, 1960     P. E. SMITH, JR     2,948,295
ELECTRICAL VALVE POSITIONER
Filed Sept. 13, 1955     2 Sheets-Sheet 1

INVENTOR.
PAUL E. SMITH JR.
BY
EZEKIEL WOLF
HIS ATTORNEY

Aug. 9, 1960   P. E. SMITH, JR   2,948,295
ELECTRICAL VALVE POSITIONER
Filed Sept. 13, 1955   2 Sheets-Sheet 2
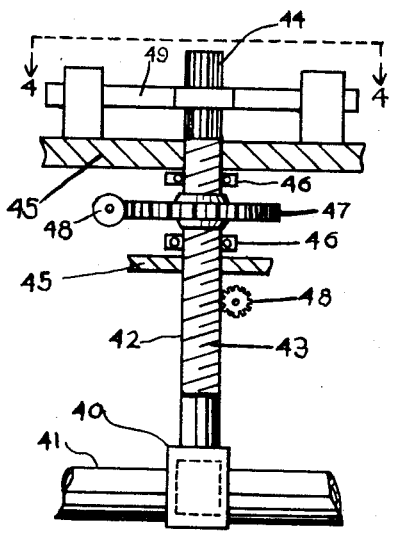
FIG. 3
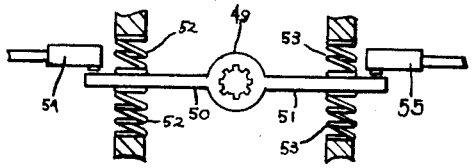
FIG. 4
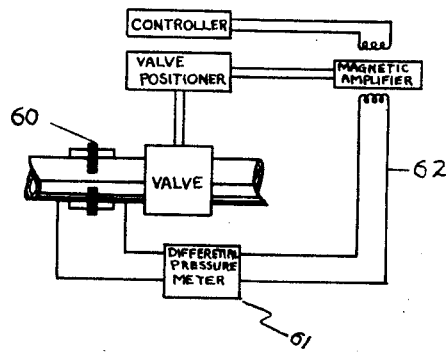
FIG. 5
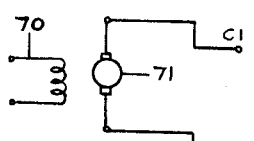
FIG. 6
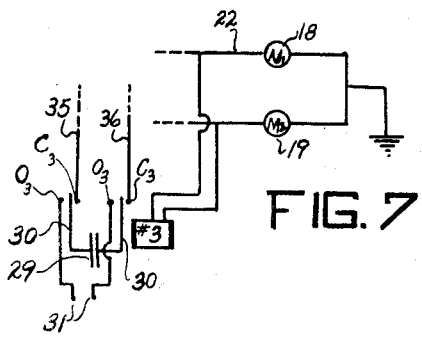
FIG. 7
FIG. 8
INVENTOR.
PAUL E SMITH JR.
BY EZEKIEL WOLF
HIS ATTORNEY.

United States Patent Office 2,948,295
Patented Aug. 9, 1960

---

2,948,295

ELECTRICAL VALVE POSITIONER

Paul E. Smith, Jr., Littleton, Mass., assignor to Conval Corporation, Belmont, Mass., a corporation of Massachusetts Filed Sept. 13, 1955, Ser. No. 534,020

9 Claims. (Cl. 137—487.5)

---

The present invention relates to a control device particularly adapted to be used as a means for controlling the operation of a valve which maintains the valve in a position corresponding to a desired fixed or variable standard.

In the present invention a control device, particularly adapted as a valve positioner or valve positioning means, is provided in which the particular position of the valve is determined by comparison of an actual value of some controlled variable, normally a function of the material passing through the valve, with a desired fixed or variable standard input signal.

The present invention may also be used in connection with the control of a number of possible variables such as speed, pressure, level, temperature, torque, pH, stress and the like with the actual controlled variable resulting from a direct or indirect effect of a liquid, gas, vapor or other flowable material whose flow is determined by the valve opening. The desired fixed or variable standard input signal which may be derived by known means is compared electronically or by any other known means with the controlled variable. The difference between the actual value of the controlled variable and the desired value or standard is utilized to vary the position of the valve through a magnetic amplifier and relay type servomechanism so that the flow of material is varied until it approaches the desired flow as determined by the difference between the desired standard and the actual value of the controllable variable. When the actual flow of material equals the desired flow, the valve is maintained in a steady position.

In the present invention, a magnetic amplifier actuates relays which are connected to one or more motors preferably shaded pole motors which are adapted to move the valve.

In the circuit arrangement utilized, unstable operation of the valve positioner is avoided by the inclusion of a damping circuit.

As the present invention utilizes an entirely electrically operated means for positioning a valve, a number of advantages over conventional pneumatically or hydraulically operated valve positioners are provided, which include the elimination of air and oil line supplies and avoiding problems of contamination of air and oil, coagulation and leakage of oil, and delayed signal transmissions in air and oil lines.

In addition, the use of a magnetic amplifier circuit is particularly advantageous over the utilization of vacuum tubes insofar as ruggedness, replacement of parts, long life and the elimination of filamentary power is concerned.

Provision of the damping circuit in the present invention provides the additional and important advantage of preventing undesirable oscillatory behavor such as hunting or overrunning while at the same time a good speed of response and accuracy is maintained.

One more substantial advantage of the present invention over valve devices utilizing vacuum tubes, is that the standby power required is but a small percentage of the rated power required for actual operation of the valve positioner.

These advantages, objects and structure of the present invention, partially set forth above, will be more clearly understood and explained in connection with the description of the drawings, in which:

Figure 3 shows the mechanical structure of a detail of the invention;

Figure 4 illustrates an end view taken substantially on the line 4—4 of Figure 3;

Figures 5 and 6 illustrate schematic views of modifications of the present invention; and Figures 7 and 8 illustrate fragmentary schematic modifications of the damping system.

Figure 1:
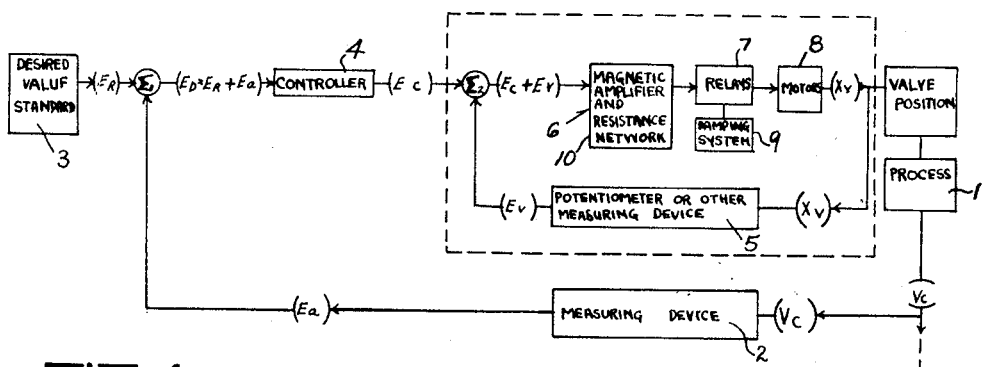
Figure 1 is a schematic diagram of the present invention as used in connection with a controller unit from which the input or command signal to operate the valve positioner is derived.

Referring to the drawings and initially referring particularly to Figure 1, there is illustrated a general schematic diagram of the present invention as it may be used in connection with the control of a particular process such as the regulation of temperature which is dependent upon the controlled flow. Taking this specific application as an example, but understanding that the present invention can be applied to a substantial number of valve control and other types of uses, the overall structure and operation of the present invention may be understood by commencing with the box labelled "valve position." The "valve position" established by a signal derived from the arrangement of the present invention, and derived in a manner hereinafter described, controls the flow of material through the pipe as indicated schematically by the process 1. By means of a suitable conventional measuring device 2, the controlled variable $V_c$ normally a function of the flow and, in this case, the temperature is measured. This controlled variable $V_c$ is converted by the measuring device 2 into an electrical signal, in this case a voltage signal $E_a$. Simultaneously, a desired value standard 3 which may be fixed or variable is also measured in terms of an input electrical signal, in this case a voltage signal $E_r$. This desired value standard may be determined by suitable means from an ideal temperature, as derived from an independent source. The voltage quantities $E_r$ and $E_a$ are vectorally added at $\Sigma_1$, and the resultant voltage signal $E_d$ which may be appropriately modified by the controller is supplied to the circuit of the present invention as an input or command signal, which in the present case for illustrative purposes is a voltage $E_c$ representative of the desired valve position. This input signal or command signal may be alternating or direct current or voltage; however, to this point conventional apparatus may be used.

Simultaneous with the application of the command signal $E_c$ representative of the desired valve position, there is also applied as a signal a measure of the actual valve position. This measure of the actual valve position $X_v$ is determined by physically measuring the position of the valve and converting this position by a suitable measuring device to an electrical signal or value. As illustrated in the drawing of the modification a potentiometer 5 may be used. Other types of measuring devices, however, may be used and may include induction type pick-offs of various types. This potentiometer 5 converts the actual measure $X_v$ of the valve position to an electrical signal, in the present case a voltage signal $E_v$. This voltage signal $E_v$, is vectorally added to the command signal $E_c$ with the resultant voltage being applied to the magnetic amplifier and resistance network 6. If there is any deviation between the command signal $E_c$ and the actual signal $E_v$, the magnetic amplifier 6 will cause selected relays dependent upon the sign of the signal to be actuated and the motors 8 in turn to operate. The motors will turn in such a direction as to cause the valve position $X_v$ to change, whereby the actual deviation of the controlled variable, a function of the flow, will be reduced. The motor or motors 8 used in this operation may be either a reversing type motor (A.C. or D.C.) or a plurality of motors operating in opposite directions dependent upon the sign of the power supply. Shaded pole motors have been found to be quite satisfactory both from an operational and a cost standpoint and are the preferred motor used in this device.

Associated with the relays, which control the operation of the motors, is a damping system 9 designed to prevent hunting or overrunning of the valve position.

Figure 2:
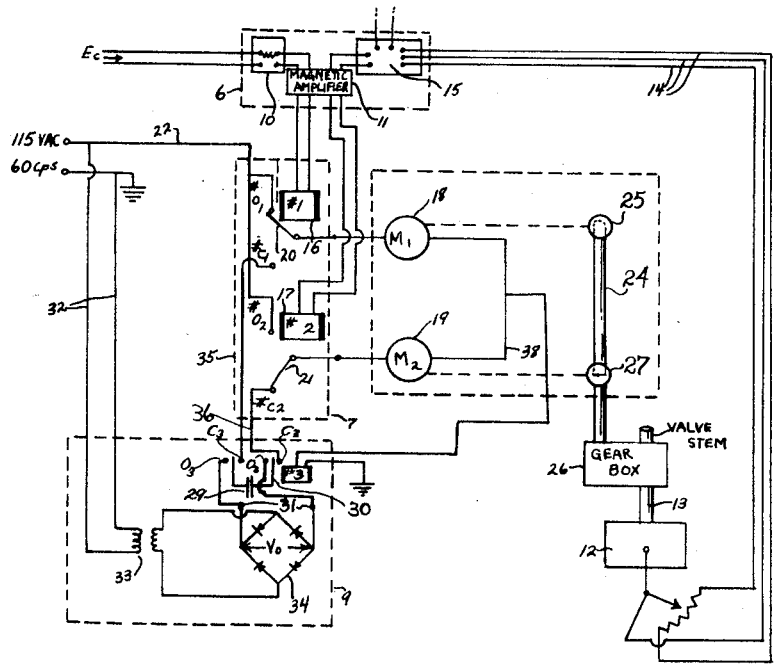
Figure 2 illustrates the circuit of a preferred form of the present invention and sets forth in detail the portion of Figure 1 shown enclosed by dotted lines.

In the specific embodiment of the present invention, illustrated in Figure 2, the dotted line enclosures 6, 7, 8 and 9 correspond respectively with the magnetic amplifier and resistance network 6, relays 7, motors 8 and damping system 9. Illustrated in Figure 2, the input or command signal $E_c$ derived from the controller 4 is applied in voltage form through an adapting resistance network 10 to the magnetic amplifier 11 where it is compared with the voltage $E_v$ derived from the actual valve position. This may be accomplished by using a suitable measuring device such as a potentiometer 12, which varies with the position of the valve stem 13. As the potentiometer is varied, the corresponding voltage $E_v$ is varied through the lines 14 and adapting resistance network 15 to the magnetic amplifier. Any undesirable deviation between the value of the command signal $E_c$ and the actual signal $E_v$ causes the magnetic amplifier to actuate one of the relays 16 or 17 depending upon the sign of the signal as determined by the relative magnitude of the values $E_c$ and $E_v$. Thus, the relay actuated will cause the proper motor 18 or 19 to move the valve stem in such a direction as to reduce the deviation determined by the comparison of the values $E_c$ and $E_v$. If the deviation is in one direction, the operation of the relay 16 causes the switch 20 to move from a normally inoperative closed position $C_1$ to a normally operative open position $O_1$, thus completing a circuit from the main through the line 22, the switch 20, the motor 18 and ground 23. The operation of the motor 18 will thus cause the shaft 24 connected to its motor armature 25 to move the valve stem 13 in one direction. The movement of the valve stem 13 will then open or close the valve as the case may be and cause a corresponding variation in the potentiometer 12. This variation in the potentiometer 12 will reflect a change in the flow of material and its function, the controlled variable, by varying the actual voltage signal $E_v$ through the lines 14. If the deviation is in an opposite direction to that which causes the relay 16 to move, the relay 17 will cause the switch 21 to move from a normally closed inoperative position $C_2$ to the open operative position $O_2$, thus causing power to flow through the lines 22, switch 21, motor 19, and ground 23. The operation of this motor 19 is such as to cause the shaft 24 attached to its armature 27 to move in an opposite direction to the direction which the shaft 24 moves when operated by the motor 18. This operation of the motor 19 will thus cause the valve stem to move in an opposite direction to that caused by the operation of the motor 18 and will, in turn, decrease the deviation of the variable as derived through the potentiometer 12.

In order to prevent unstable operation of the relays, a damping circuit is provided. This circuit is used whenever alternating current motors of the inductance or synchronous type are used to control movement of the valve stem. In its operation a capacitor 29 may be connected by a relay operated double pole switch 30 to contacts $C_1$ and $C_2$ through contacts $C_3$ with $C_1$ and $C_2$ closed when the motors 18 and 19 are not operating.

A direct voltage source is provided by a D.C. main or by a rectifier. In Figure 2, a rectifier circuit is shown with the A.C. power derived from the lines 32 and the transformer 33, the power being converted to a direct current by the rectifier 34. When the motors 18 and 19 are not operating, the condenser 29 is connected between the lines 35 and 36 which, in turn, connect to the contacts $C_1$ and $C_2$ respectively. In the operation of this damping circuit, it should be understood that the switches 20 and 21 when the motors 18 and 19 are not operating are normally in a closed position. Thus, when a deviation signal is applied through the magnetic amplifier to either relay 16 or 17, but taking for the present, however, as an example a deviation being passed through the relay 16, switch 20 will move to position $O_1$ and the motor 18 will operate to reduce the deviation to an acceptably small value. At the same time the motor current flowing through the coil of relay number 3 causes the switch 30 to close to contacts $O_3$ and connect the capacitor 29 through contacts $O_3$ to the D.C. source 31. When the deviation is acceptably small, the relay 16 will be deenergized, permitting the switch 20 to return to its normally closed position $C_1$. When the switch 20 thus closes to the contact $C_1$, the motor 18 is connected across the capacitor 29, through the switch 30, line 35, switch 30, contacts $C_3$, line 36, switch 21, motor 19 and line 38. Up until this point, the capacitor 29 has been allowed to charge during the time interval in which the motor 18 had been running. The charge on this capacitor when connected across the motors discharges through the motor windings in a uni-directional pulse. This pulse of current causes a non-pulsating field to exist in the air gap, which induces currents in the moving rotor of the motors 18 and 19 such as to produce torques tending to oppose the motor armature's motion. This torque causes the motors to stop turning almost instantly. The amount of charge built up on the capacitor 29 is proportionate to the length of time during which the motor 18 is running up to a limiting charge of $CV_0$ where C is the capacitance of the capacitor 29 and $V_0$ is the voltage of the D.C. source 31. Thus, if the motor 18 has been running for a relatively long time and its momentum is substantial, there is a need for a greater damping effect than if the motor had been running only a short time. This greater damping effect is readily obtained by reason of the fact that the condenser 29 has also been permitted to charge up for a greater period of time. It has been found that unless a damping circuit such as described is used in this device the motor will tend to coast when it is deenergized. This will, of course, cause the valve stem to continue to move, in turn, causing a deviation in the reverse direction. The motor is then reversed and will thus cause a continuous hunting or overrunning.

Figures 3 and 4 illustrate a construction which may be used for operation of the valve stem. In this structure a conventional valve 40 controlling the flow of material through the pipe 41 is provided with a valve stem 42. This stem 42 is provided with a threaded section 43 and splined end 44. The stem is mounted on the supports 45 with thrust bearings 46. Suitable meshing gears 47 and 48 are provided for longitudinal movement of the stem 42 with the gear 47 internally threaded to mesh with the threads 43. The worm gear 48 may be suitably connected to the motor shaft 24. Also suitably mounted and meshing with the threads 43 is the gear 48 which may be suitably connected to operate the potentiometer or other measuring device 12. Positioned at the top of the stem is a sliding block 49 axially mounted and internally splined to slide longitudinally on the splined section 44. This sliding block 49 (see Figure 4) is provided with outwardly extending arms 50 and 51 which are tensioned and normally maintained in a fixed position by opposing helical springs 52 and 53. Microswitches 54 and 55 are positioned to be operated by the arms 50 and 51 respectively if the sliding block 49 rotates slightly out of its normal fixed position. The microswitches 54 and 55 are connected (not shown) to cut off the power of the motors 18 and 19 respectively when actuated. Thus, if for some reason, the motors 18 or 19 continue to operate and continue to move the valve stem 42 beyond the limits of its normal longitudinal motion, or if a foreign body be located at the valve seat, a point will be reached at which the valve stem will begin to bind in its longitudinal movement. As this binding of longitudinal movement increases, there is a natural tendency for the stem 42 to rotate in a direction of the torque applied through the gears. This rotational movement will cause a corresponding rotation of the sliding block 49. When the sliding block 49 in turn rotates the appropriate microswitch 54 controlling the operating motor will be actuated causing the operating motor to be turned off. When the motor is thereby turned off the excessive opening or closing of the valve is terminated and the application of further torque is terminated.

In Figure 5 there is illustrated a modification in which the actual value signal is derived by a direct measurement of the flowing medium. This structure is obtained by replacing the valve potentiometer by the flow measuring unit, thus as an example, a flow meter 60 mounted integral with the valve directly measures the flow of material with this measurement being converted by the differential pressure meter 61 to an electrical signal which is transmitted by means of the line 62 to the magnetic amplifier. This signal is the compared and applied in a manner as described above.

Although the device as set forth above is suitable for most applications, there may be occasions, particularly when control of larger valves and other devices is required when provisions for added power must be made. In such applications, the two motors may be replaced by two large motors, or four motors, or one reversing motor, such as a three-phase induction type motor. The magnitude of the relays will correspondingly have to be changed or in some instances secondary relays operated by the relays 16 and 17 may be used. The other circuitry of the invention will remain substantially the same except that in the damping circuit the capacitor may be replaced, if necessary, by an unloaded direct current (separately excited shunt type) motor of suitable size. The armature of this motor will electrically replace the capacitor in the damping network and will provide a capacitance determined by the formula $$C = \frac{J}{K^2}$$

where J equals the motor armature inertia and K equals the motor stall torque to armature current ratio. Such an arrangement is illustrated in Figure 6 where 70 is the power source and 71 is the D.C. motor.

A modification of the damping circuit and its operation is shown in Figure 7. This modification utilizes a high impedance low current A.C. relay 3 connected as shown between motors 18 and 19. When either motor is energized through closure of switch 20 or 21 respectively, the A.C. source 22 will be simultaneously applied to the relay 3. Thus, as a specific example, if motor 18 is energized, current will flow through line 22, switch 20 (see Figure 2) the coil of relay 3, motor 19 and line 23 to ground. The magnitude of this current is kept small enough so that motor 19 develops negligible torque compared to the operating motor 18. Relay number 3 will then operate switch 30 as previously described.

A further modification of the damping circuit is shown in Figure 8 where relay 3 is eliminated. Here a small direct current is allowed to flow through the motors 18 and 19 when inoperative. By suitable design the magnitude of this current is kept small enough so that its heating effect is a minimum. In the operation of this modification, referring to Figure 2 as modified by Figure 8, the capacitor 29 is connected through a resistance 30 to a direct voltage source 31. This direct voltage source may be provided by a D.C. main or by a rectifier. The condenser 29 is connected between the lines 35 and 36 which, in turn, connect the D.C. source with the contacts $C_1$ and $C_2$ respectively. In the operation of this damping circuit, it should be understood that the switches 20 and 21 when the motors 18 and 19 are not operating are normally in a closed position. Thus, when a deviation signal is applied through the magnetic amplifier to either relay 16 or 17, but taking for the present, however, as an example a deviation being passed through the relay 16, the motor 18 will operate to reduce the deviation to an acceptably small value at which point the relay 16 will be deenergized, permitting the switch 20 to return to its normally closed position $C_1$. When the switch 20 thus closes to the contact $C_1$, the motor 18 is connected across the capacitor 29, through the switch 20, line 35, line 36, switch 21, motor 19 and line 38. Up until this point, the capacitor 29 has been allowed to charge during the time interval in which the motor 18 had been running. The charge on this capacitor when connected across the motors discharges through the motor windings in a uni-directional pulse. The pulse thus passing through the motor will cause a damping effect identical to the effect obtained in the modications previously described.

Although this invention has been described essentially as being applied to the control of the flow of flowable material, it should be understood that the arrangement herein described may readily be adapted and utilized for the positioning of any type of physical object in addition to a valve, as for example, a control surface in aircraft or guided missiles.

Having now described my invention, I claim:

1. Process control apparatus comprising, means defining a closed feedback loop including condition controlling means for affecting the value of a parameter of said process, means for deriving an electrical signal characteristic of the actual condition established by said condition controlling means, means for deriving an electrical signal characteristic of said parameter value, means outside said feedback loop responsive to said parameter value signal for providing an output electrical signal characteristic of the condition desired to be established by said condition controlling means, and electrical means within said feedback loop responsive to said actual condition signal and said output signal for actuating said condition controlling means to reduce the difference between said actual condition and said desired condition.

2. A means for positioning a valve in accordance with an electrical signal derived from a standard signal and a controlled variable which is a function of the material passing through the valve, comprising, means including said valve defining a closed feedback loop, the position of said valve affecting the value of said variable, means outside said feedback loop for deriving a variable electrical signal characteristic of the value of said variable, means inside said feedback loop for providing an actual position electrical signal representative of the actual position of said valve, a source of said standard signal, means outside said feedback loop for combining said standard signal with said variable signal to derive a control signal, a controller outside said feedback loop responsive to said control signal for providing a desired position signal representative of a desired position of said valve, means within said feedback loop for combining said desired position signal with said actual position signal to provide a positioning signal, and means within said feedback loop responsive to said positioning signal for altering said valve position to lessen the difference between said actual position and said desired position.

3. A means for at least in part positioning a valve in accordance with a signal derived from a controlled variable, said variable being a function of the material passing through the valve comprising a valve having material with a controlled variable as a function thereof passing therethrough, means for deriving a signal from said variable, means providing a desired value standard signal and variable signal and combining the latter signals to obtain a control signal, a controller responsive to said control signal for providing a control signal pulse representative of the desired position of said valve, means for deriving a feedback signal pulse representative of the actual position of the valve, a magnetic amplifier for receiving and vectorally adding said control signal pulse and feedback signal pulse, relays operated by said amplifier at selected positive and negative pulse signals, respectively, and at least one motor having a power source controlled by the operation of said relays and operatively controlling the position of said valve to lessen the difference between said desired and actual positions.

4. An operating means for operating a valve in accordance with a control electrical signal representative of the desired position of said valve obtained from a process controller which controller has as its input signals a standard or reference signal and a controlled variable signal which is a measure of the condition of the process being controlled the combination comprising, means for providing said standard or reference signal, means for providing said controlled variable signal, said controller, a valve, means for controlling the position of said valve, means for deriving an actual electrical signal representative of the actual position of said valve, means for vectorally adding said control and said actual electrical signals, and means for feeding said vectorally added signals to said position controlling means as an activating signal to lessen the difference between said actual and said desired positions.

5. An operating means for operating a valve in accordance with a control electrical signal obtained from a process controller which controller has as its input signals a standard or reference signal and a controlled variable signal which is a measure of the condition of the process being controlled the combination comprising, means for providing said standard or reference signal, means for providing said controlled variable signal, said controller, a valve, means for providing said control electrical signal as a separate and distinct electrical signal to said operating means, means for controlling the position of said valve, means for deriving an actual electrical signal representative of the actual position of said valve, means for vectorally adding said actual and said control electrical signals, and means for feeding said vectorally added signals to said position controlling means as an activating signal to lessen the difference between said actual and desired positions.

6. A system for controlling an actual condition in accordance with an electrical signal, comprising a process controller, means for producing an input signal which is related to said actual condition, controlled means for feeding said input signal to said controller for providing an output signal representative of a desired condition, positioning means for controlling said actual condition, means for deriving an actual electrical signal representative of said actual condition, means for vectorally adding said output and said actual electrical signals, and means for feeding said vectorally added signals to said positioning means as an activating signal to lessen the difference between said actual and desired conditions.

7. A system for controlling a condition comprising a process controller, means for producing an input signal which is a function of the condition being controlled, means for feeding said input signal to said controller for providing an output control signal representative of a desired valve position, a valve, means for controlling the position of said valve, means for deriving an actual electrical signal representative of the actual position of said valve, means for vectorally adding said control and said actual electrical signals, and means for feeding said vectorally added signals to said position controlling means as an activating signal to reduce the difference between said actual and desired position.

8. A system for controlling an actual condition in accordance with an electrical signal, comprising a process controller, means for producing an input signal related to said actual condition for providing a control signal representative of a desired condition, means for feeding said input signal to said controller, means for controlling said actual condition, means for deriving an actual electrical signal representative of said actual condition, means for vectorally adding said actual and said control electrical signals, and means for feeding said vectorally added signals to said actual condition controlling means as an actuating signal to reduce the difference between said actual and desired conditions.

9. A device as set forth in claim 8 and further comprising, a source of a reference signal, a source of a measure signal which is related to said actual condition being controlled and means for combining said measure and reference signals to derive said input signal.

References Cited in the file of this patent

UNITED STATES PATENTS

| | | |
|---|---|---|
| 1,513,457 | Jackson | Oct. 28, 1924 |
| 2,192,714 | Norman et al. | Mar. 5, 1940 |
| 2,207,921 | Huxford | July 16, 1940 |
| 2,320,508 | Burns et al. | June 1, 1943 |
| 2,434,919 | Girard | Jan. 27, 1948 |
| 2,445,806 | Snyder | July 27, 1948 |
| 2,509,295 | Glass | May 30, 1950 |
| 2,519,043 | Greenwood et al. | Aug. 15, 1950 |
| 2,536,184 | Johnson | Jan. 2, 1951 |
| 2,629,826 | McIlvaine | Feb. 24, 1953 |
| 2,743,402 | Ehret | Apr. 24, 1956 |

FOREIGN PATENTS

| | | |
|---|---|---|
| 793,622 | France | Nov. 23, 1935 |